July 14, 1964  H. J. FREEDMAN ETAL  3,141,156
DANGER INDICATOR
Filed June 14, 1961
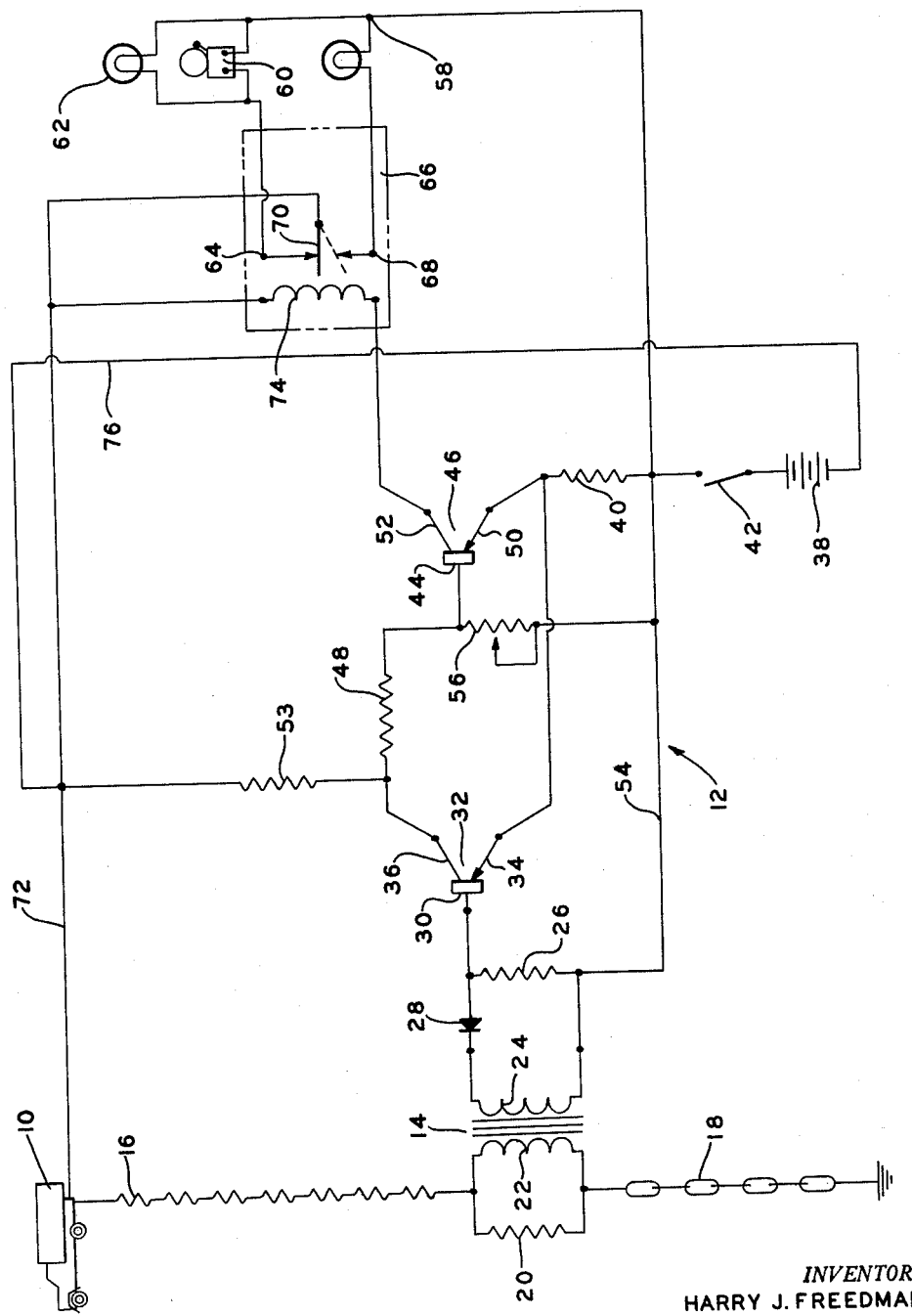
INVENTORS
HARRY J. FREEDMAN
HARRY A. ROMAIN
BY
Arthur H. Seidel
ATTORNEY

United States Patent Office 3,141,156
Patented July 14, 1964

3,141,156
DANGER INDICATOR
Harry J. Freedman, 240 N. 13th St., and Harry A. Romain, 2201 Pennsylvania Ave., both of Philadelphia, Pa.
Filed June 14, 1961, Ser. No. 117,167
3 Claims. (Cl. 340—255)

This invention relates to a danger indicator, and more particularly to a warning device for indicating the presence of high voltage on a vehicle body, portable rig, and like equipment.

Specialized vehicles are conventionally used by work crews handling or working on high voltage overhead wires, repair of overhead wires, replacement of electrical equipment on telephone poles, etc. Quite often a wire is dropped by a lineman on top of the vehicle. If the vehicle is not grounded, a member of the ground crew may be severely burned or killed if he should touch the vehicle. Grounding the truck frame directly to the ground safeguards a man on the ground or in the truck, but disrupts service to the entire circuit as soon as the wire hits the truck. The present invention overcomes this inconvenience and danger by providing a warning device to indicate that a high voltage wire is contacting the body or frame of the vehicle.

It is an object of the present invention to provide a novel danger indicator.

It is another object of the present invention to provide a danger indicator comprising an electronic circuit for indicating that a live high voltage wire is contacting the metallic body or frame of a vehicle.

Other objects will appear hereinafter.

For the purpose of illustrating the invention there is shown in the drawings a form which is presently preferred; it being understood, however, that this invention is not limited to the precise arrangements and instrumentalities shown.

The figure of the drawing discloses a schematic diagram of the electrical circuit connected to the body of the vehicle in accordance with the present invention.

Referring to the drawing in detail, wherein like numerals indicate like elements, the metallic frame of a self-propelled vehicle is illustrated schematically as 10. A danged indicator designated generally as 12 is connected to the frame 10.

The danger indicator 12 includes a step-down transformer 14 connected to the frame 10 by seven one meg ohm resistors 16 each having a power capacity of two watts. The truck frame 10 is grounded by means of a chain 18 connected to the transformer 14. The transformer 14 is provided with a two watt 15,000 ohm resistor 20 in parallel with the primary coil 22 of the transformer 14.

The secondary coil 24 of the transformer 14 is part of a fail-safe transistorized flip-flop circuit. A 1,000 ohm resistor 26 extends across the terminals of the secondary coil 24. One side of the secondary coil 24 is coupled to the cathode of a diode rectifier 28 the anode of which is coupled to the base 30 of a transistor 32. The transistor 32 is provided with an emitter 34 and a collector 36.

The emitter 34 is connected to the plus side of a 12-volt battery 38 through a one ohm resistor 40 and a manual switch 42. The collector 36 of the transistor 32 is connected to the base 44 of a transistor 46 through a 4700 ohm resistor 48 and through resistor 53 to the negative side of battery 38. The transistor 46 is provided with an emitter 50 and a collector 52. The emitter 50 is connected to the plus side of the battery 38 through the resistor 40. The base 44 is connected to the negative side of the battery 38 through a 2200 ohm resistor 53.

The conductor between the resistor 48 and the base 44 is connected to the wire 54 through a 250 ohm variable resistor 56. The wire 54 extends from the other output terminal of the coil 24 to the plus side of the battery 38 and to the terminal 58.

An audible signaling device such as bell 60 and a visual indicator such as light 62 are connected in parallel between the terminal 58 and the terminal 64 of relay switch 66. Terminal 68 of the switch 66 is connected to the terminal 58. A switch element 70 is alternatively connected to either the terminal 64 or the terminal 68. The switch element 70 is biased by any conventional means such as a spring (not shown) so as to be in contact with the terminal 64. The switch element 70 is connected by a conductor 72 to the negative side of the battery 38 and the frame 10.

The switch element 70 is maintained in contact with the terminal 68 under the influence of the coil 74. One end of the coil 74 is coupled to the collector 52 and is connected to the plus side of the battery 38 through the transistor 46 and resistor 40. The other end of the coil 74 is coupled to wire 72 and is connected to the negative side of the battery 38 through the wires 72 and 76.

The danger indicator of the present invention is utilized in the following manner:

It will be assumed that the switch 42 is closed and that a high voltage wire is in contact with the vehicle frame 10. As indicated, the vehicle frame 10 is grounded through the high resistance bleeder 16 and the chain 18. The transformer 14 is a step-down transformer which steps down the voltage from the high resistance bleeder 16 and actuates the flip-flop circuit.

Since the coil 74 is connected across the terminals of the battery 38, the switch element 70 is retained in the phantom position shown in the drawings. When the flip-flop circuit is actuated by a voltage from the transformer 14, current ceases to flow in the coil 74 thereby enabling the switch element 70 to make contact with the terminal 64. In this position of the switch element 70, the visual indicator 62 and audible indicator 60 are connected across the terminals of the battery 38 and are actuated to render an ascertainable signal. Thus, personnel on the ground or inside the cab of the vehicle are warned of the danger of getting into or out of or otherwise touching the frame of the vehicle having the frame 10. As soon as the high voltage wire is removed from contact with the frame 10, the flip-flop circuit permits current to flow through the coil 74 thereby causing the switch element 70 to assume the phantom position shown and the indicators 60 and 62 cease to give a signal.

If for any reason the flip-flop circuit is inoperative or the battery is incapable of activating the coil 74, the visual and audible alarms will be activated. Accordingly, the danger indicator of the present invention is capable of indicating a defect in the electrical circuit.

It will be appreciated by those skilled in the art that other circuitry may be employed for accomplishing the desired result. If desired, the battery 38 may be the battery for the vehicle having the frame 10. Preferably, the indicators 60 and 62 are located within the cab of a vehicle. If desired, an additional indicating device may be provided in parallel with the indicators 60 and 62 with said additional indicator being positioned on the outside of the vehicle having the frame 10.

It will be appreciated that the above enumerated values for the elements of the circuit are merely exemplary of values for one operative embodiment.

The present invention may be embodied in other specific forms without departing from the spirit or essential attributes thereof and, accordingly, reference should be made to the appended claims, rather than to the foregoing specification as indicating the scope of the invention.

We claim:

1. A danger indicator comprising a metal frame for supporting personnel, means grounding said frame through a high resistance, a deactivated signalling device on said frame, said signalling device being connected to a source of power, an electrical circuit means connected to said frame and said signalling device for activating said signalling device in response to the presence of a voltage in said frame capable of harming personnel on said frame, said electrical circuit means including the primary of a transformer, said electrical circuit means additionally including a secondary winding in mutual inductive relation with said primary winding, whereby said electrical circuit means is isolated from said means grounding said frame.

2. The danger indicator of claim 1 wherein said electrical circuit means includes safety means for activating said signaling device when said electrical circuit means is unable to operate correctly.

3. A danger indicator in accordance with claim 1 wherein said signaling device is deactivated by means of a relay operated switch, said electrical circuit means including a flip-flop circuit, the coil of said relay operated switch being connected to the terminals of said source of power through said flip-flop circuit, said secondary winding being connected to the input of said flip-flop circuit, whereby the presence of a voltage in said frame interrupts the flow of current from said source of power to said coil thereby enabling said switch to close contacts connecting said signaling device across the terminals of said source of power.

References Cited in the file of this patent

UNITED STATES PATENTS

| | | |
|---|---|---|
| 2,658,191 | Stolp | Nov. 3, 1953 |
| 2,816,264 | Hood | Dec. 10, 1957 |
| 3,029,421 | Beguin | Apr. 10, 1962 |
| 3,081,449 | Wernlund | Mar. 12, 1963 |

FOREIGN PATENTS

| | | |
|---|---|---|
| 28,059 | Great Britain | Dec. 21, 1903 |